March 22, 1966  B. D. MONTGOMERY  3,241,643
CLUTCH
Filed Sept. 13, 1963  2 Sheets-Sheet 1

Inventor:
Byron D. Montgomery
By: John W Butcher  Atty.

March 22, 1966    B. D. MONTGOMERY    3,241,643
CLUTCH
Filed Sept. 13, 1963    2 Sheets-Sheet 2
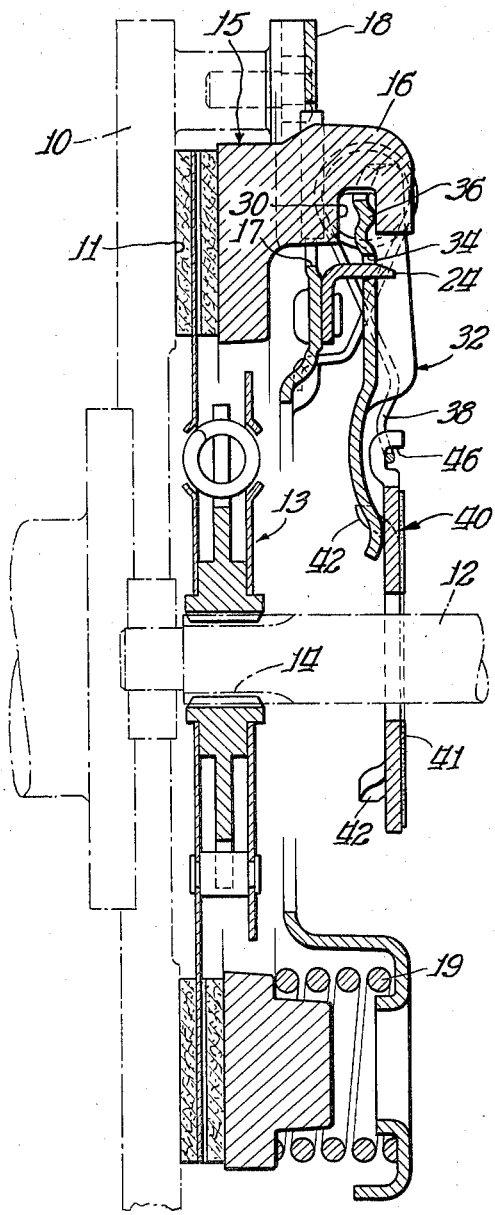
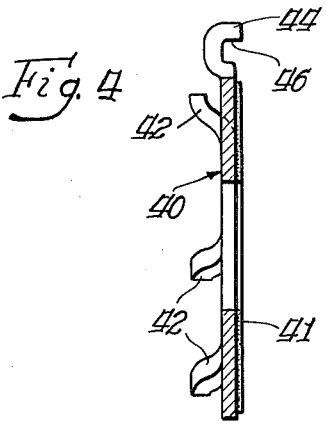
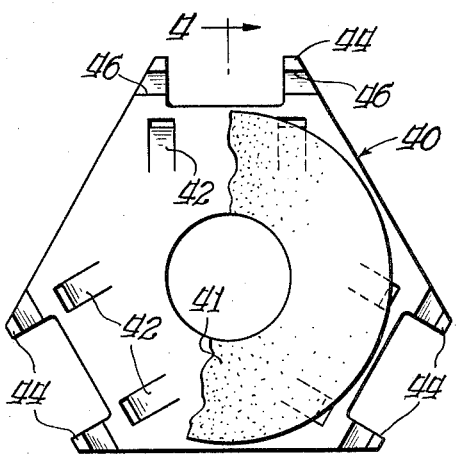
Inventor:
Byron D. Montgomery
By: John W. Butcher    Atty

United States Patent Office 3,241,643
Patented Mar. 22, 1966

3,241,643
CLUTCH
Byron D. Montgomery, Birmingham, Mich., assignor to Borg-Warner Corporation, Chicago, Ill., a corporation of Illinois
Filed Sept. 13, 1963, Ser. No. 308,735
3 Claims. (Cl. 192—66)

This invention relates to friction clutches of the type employed in motor vehicles.

It has been a practice to form various elements of a clutch such as, for example, the cover plate, the release levers, and at least portions of the driven member by stamping these elements from relatively thin metal stock.

One of the advantages in using stamped release levers is that the inner terminal ends of each lever may be bent to align the respective release levers in a common radial plane for engagement of these ends with the clutch release bearing. The stamped release levers, however, are of softer metal—relative to case or forged release levers—and as a result the wear rate is somewhat greater with the stamped levers than with the cast or forged levers. The wear problem with these stamped release levers may be more acute if one of the release levers is slightly out of alignment such that it engages the release bearing before the remaining release levers.

If the rotating clutch elements are not maintained substantially concentric with respect to the driven shaft and more particularly the face of the clutch release bearing, the inner ends of the release levers will tend to slide on the face of the clutch release bearing. This sliding action may subject the release levers and their respective brackets to excessive radial forces. This action further creates a wear and a noise or squeaking condition.

Briefly described, this invention relates to the provision of a disengaging ring between the inner terminal ends of the clutch release levers and the clutch release bearing. The disengaging ring is connected to and rotates with the clutch release levers and presents a surface for engagement with the clutch release bearing. The surface is characterized as exhibiting a low coefficient of friction when in contact with the release bearing.

Additional advantages of the invention contemplated herein will be apparent after considering the description hereinafter set forth in connection with the drawing affixed hereto. Reference is now made to the accompanying drawing forming a part of the specification wherein:

FIGURE 2 is a side view of the clutch assembly, partially in cross-section, taken generally along lines 2—2 of FIGURE 1;

FIGURE 3 is an end view of the disengaging ring portion of the clutch assembly; and FIGURE 4 is a view, partially in cross-section, taken generally along lines 4—4 of FIGURE 3.

Figure 1:
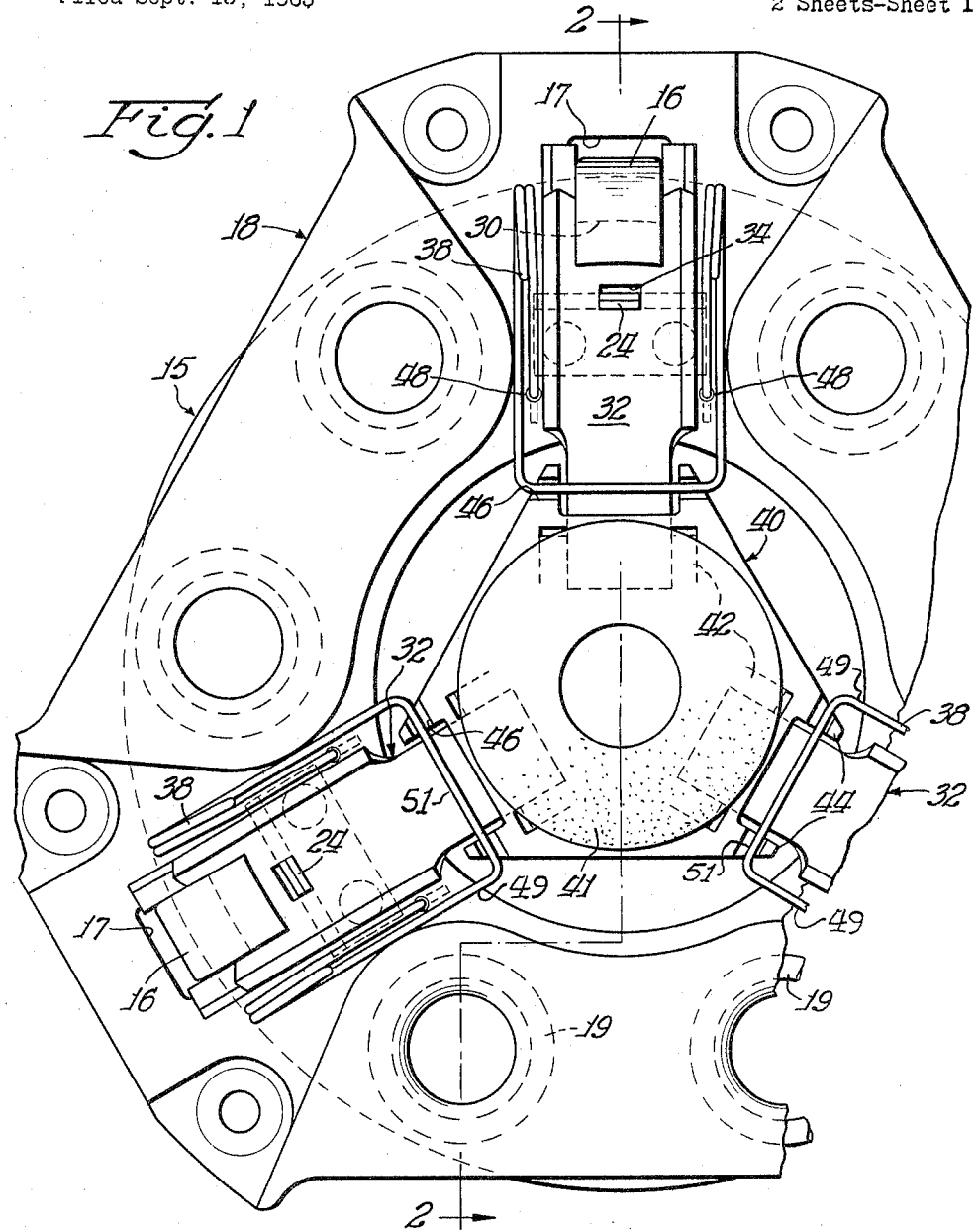
FIGURE 1 is an end view of the clutch assembly.

Referring now to the drawing, and more particularly, FIGURE 2, the clutch assembly includes a flywheel 10 with a clutch engaging face 11, a transmission or output shaft 12, a driven member 13 secured upon a splined end 14 of the transmission shaft or driven shaft 12, and a pressure plate 15 having drive lugs 16 formed as a part thereof. The drive lugs 16 extend through apertures 17 formed in the cover plate 18. The cover plate 18 may be secured to the flywheel 10 by suitable means such as, for example, stud bolts. A plurality of compression coil springs 19 which are positioned between the cover plate 18 and the pressure plate 15 provide for engagement of the pressure plate with the driven member 13.

Fulcrum members 24 are attached to the exterior portion of the cover plate 18 and are positioned adjacent the apertures 17. Each of the drive lugs 16 has a recess 30 formed therein for receipt of one end of the release lever 32. Each release lever 32 is provided with a fulcrum engaging means 34 and a recess engaging means 36. The release levers 32 are positioned on the exterior portion of the cover plate 18 and are held in engagement with their respective recesses 30 and fulcrum means 34 by way of clutch release lever springs 38.

A disengaging ring 40 includes a plurality of spring engaging arms 44. Each of the arms 44 may include a recess 46 for receipt of a section of the release lever spring 38. The surface of the disengaging ring 40 which faces the clutch release bearing preferably includes a coating of a low coefficient of friction material 41 which may be fastened to the disengaging ring 40 by any suitable means such as, for example, by use of an adhesive. This low coefficient of friction material 41 may be any material which, when in contact with metal, exhibits a lower coefficient of friction than metal in contact with metal. A material suitable for use as the coating is a tetrafluoroethylene resin marketed under the tradename of Teflon.

The clutch release lever springs extend from apertures 48 formed in the clutch cover plate. These springs are arranged with arms 49 on opposite sides of the clutch release lever and with a mid portion 51 which engages the recess 46 of the spring engaging arms 44. These clutch release lever springs serve a dual purpose in that they maintain the disengaging ring in contact with the clutch release levers and they urge the inner ends of the clutch release levers toward the driving member or flywheel 10.

The low coefficient of friction material 41 provides for an increased contact area between the clutch release levers 32 and clutch release bearing. The release bearing and the disengaging ring may shift with respect to each other—as is the condition when the two elements are non-concentric—without subjecting the clutch release levers 32 to an excessive amount of wear. If the clutch release bearing and the disengaging ring shift with respect to each other, the preferred low coefficient of friction material 41, i.e., Teflon, prevents undue noises which would otherwise result from metal to metal contact.

It is to be understood that the above described embodiment of the invention is merely intended to be illustrative of the principal features of the invention. Numerous other arrangements and modification may be readily devised by those skilled in the art to achieve a similar apparatus which will still be encompassed by the spirit and scope of the present invention.

I claim:

1. A clutch comprising a driving member, a pressure plate, a driven member interposed between said driving member and said pressure plate, a cover plate connected to said driving member surrounding said driven member and said pressure plate, a plurality of fulcrum members carried by said cover plate, resilient means positioned between said cover plate and said pressure plate effective to urge said pressure plate toward said driving member, a plurality of clutch release levers connected to said pressure plate and said fulcrum members extending radially inwardly and having inner terminal ends, a disengaging ring connected to said inner terminal ends including a radial surface for engagement with a clutch release bearing, release lever springs connected to said cover plate and said release levers to urge said inner terminal ends toward said cover plate, said release lever springs connected to said disengaging ring to connect said disengaging ring to said inner terminal ends of said release levers and a coating of low coefficient of friction material on said radial surface.

2. An apparatus in accordance with claim 1 wherein said disengaging ring includes a ring-shaped body having a plurality of lever engaging means and a plurality of radially extending spring engaging arms, each including a recess for engagement with said release lever springs.

3. A clutch comprising a driving member, a pressure plate, a driven member interposed between said driving member and said pressure plate, a cover plate connected to said driving member surrounding said driven member and said pressure plate, a plurality of fulcrum members carried by said cover plate, resilient means positioned between said cover plate and said pressure plate effective to urge said pressure plate toward said driving member, a plurality of clutch release levers connected to said pressure plate and said fulcrum members extending radially inwardly and having inner terminal ends, a disengaging ring connected to said inner terminal ends providing a radial surface for engagement with a clutch release bearing, and a release lever spring associated with each of said release levers anchored to said cover plate extending on opposite sides of said release levers having a mid portion in engagement with said disengaging ring to hold said disengaging ring in engagement with said release levers, said release lever springs each including a portion in engagement with said inner terminal ends of said release levers whereby each inner terminal end of said release levers is urged axially toward said cover plate.

References Cited by the Examiner
UNITED STATES PATENTS

| 1,882,897 | 10/1932 | Reed | 192—110 |
| 2,046,916 | 7/1936 | Kieffer | 192—110 X |

FOREIGN PATENTS

| 847,057 | 6/1939 | France. | |

DON A. WAITE, *Primary Examiner.*

DAVID J. WILLIAMOWSKY, *Examiner.*